Alexander B. Hildebrandt
INVENTOR.

BY John D. Gassett
ATTORNEY

Sept. 27, 1966  A. B. HILDEBRANDT  3,274,694
APPARATUS FOR MEASURING THE AZIMUTH AND
INCLINATION OF A BOREHOLE
Filed July 15, 1964   6 Sheets-Sheet 2

Alexander B. Hildebrandt
INVENTOR.

BY John D. Gassett
ATTORNEY

Sept. 27, 1966 A. B. HILDEBRANDT 3,274,694
APPARATUS FOR MEASURING THE AZIMUTH AND
INCLINATION OF A BOREHOLE
Filed July 15, 1964 6 Sheets-Sheet 3

Alexander B. Hildebrandt
INVENTOR.

BY John D. Gassett
ATTORNEY

Sept. 27, 1966 A. B. HILDEBRANDT 3,274,694
APPARATUS FOR MEASURING THE AZIMUTH AND
INCLINATION OF A BOREHOLE
Filed July 15, 1964 6 Sheets-Sheet 4

Alexander B. Hildebrandt
INVENTOR.

BY John D. Gassett
ATTORNEY

Alexander B. Hildebrandt
INVENTOR.

BY John D. Gassett

ATTORNEY

Sept. 27, 1966   A. B. HILDEBRANDT   3,274,694
APPARATUS FOR MEASURING THE AZIMUTH AND
INCLINATION OF A BOREHOLE
Filed July 15, 1964   6 Sheets-Sheet 6
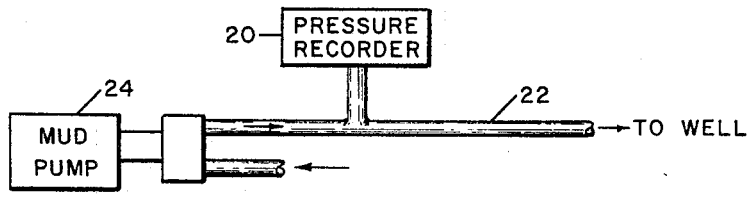
FIG. 13
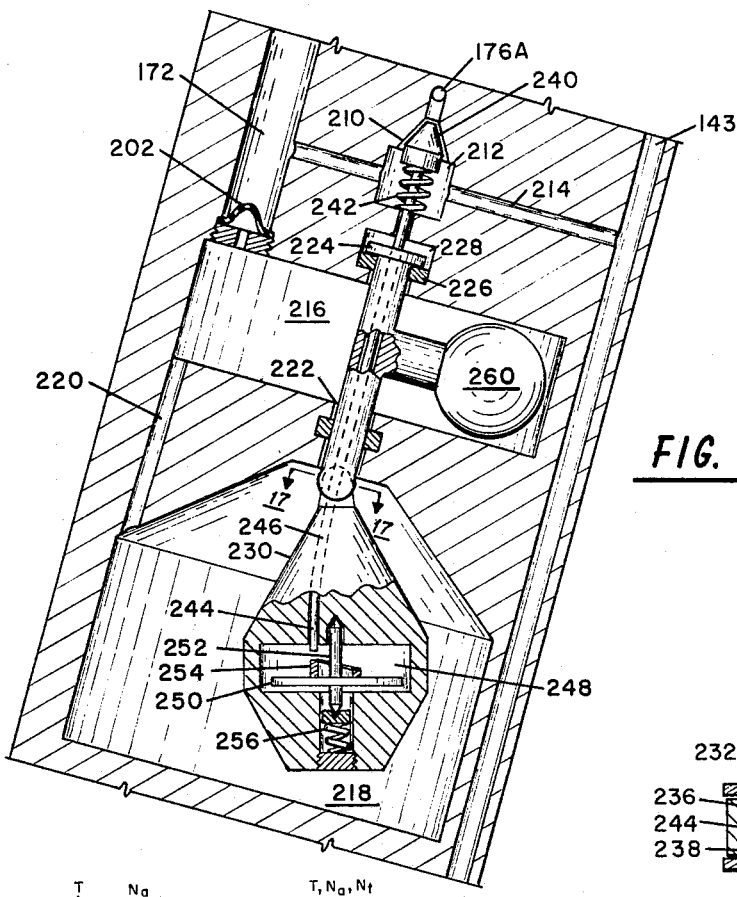
FIG. 14
FIG. 17
FIG. 15    FIG. 16
Alexander B. Hildebrandt
INVENTOR.
BY John D. Gassett
ATTORNEY 3,274,694
APPARATUS FOR MEASURING THE AZIMUTH AND INCLINATION OF A BOREHOLE
Alexander B. Hildebrandt, Tulsa, Okla., assignor, by mesne assignments, to Esso Production Research Company, Houston, Tex., a corporation of Delaware
Filed July 15, 1964, Ser. No. 382,783
14 Claims. (Cl. 33—205)

This invention relates to the drilling of boreholes, such as oil wells, into the earth. It is particularly related to an apparatus for measuring the inclination from the vertical of the borehole as it is being drilled and the azimuth of such inclination.

During the drilling of a well bore in the earth, it is important to know whether the hole is drilling in a vertical or inclined direction, and if it is not going in a vertical direction to know the direction and magnitude which the hole is inclined. It is important to know these two parameters whether the well is being drilled in a vertical direction or if it is being intentionally directionally deviated so as to "bottom" at a prescribed location. There is a need for means which permit frequent readings of drift indications. The system of this invention permits frequent readings of signals from a tool conveniently called a drilling drift indicator which remains in the drill string during drilling operations. A full understanding of the invention and its many objects will be readily apparent from the following description taken in conjunction with the drawing which:

Figure 3:
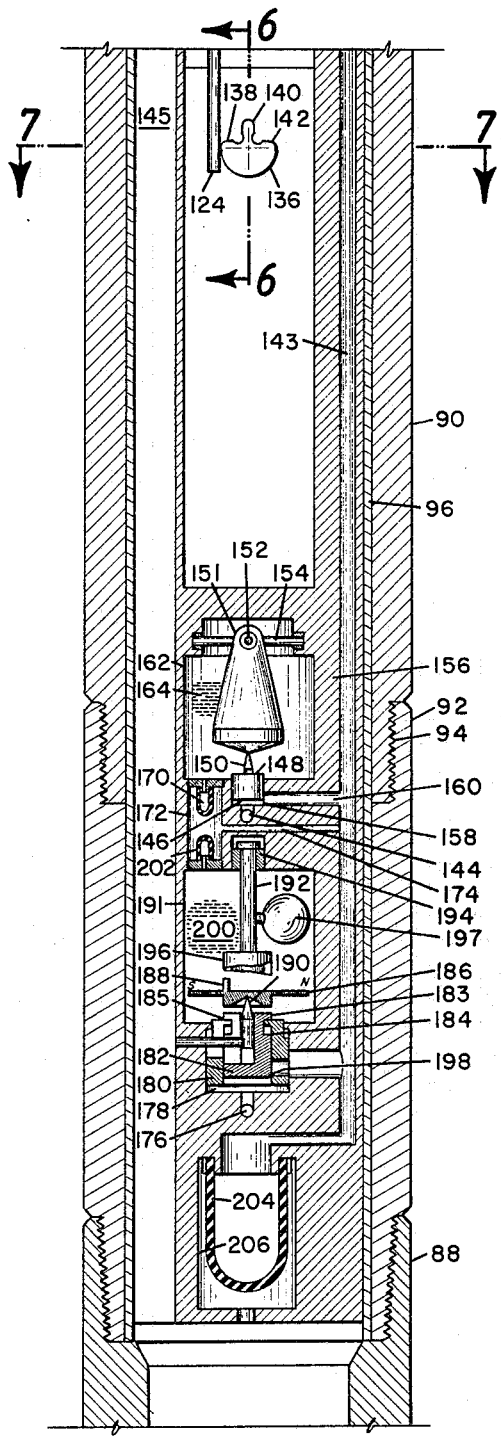
FIG. 3 is a lower portion of the drilling drift indicator partly shown in FIG. 2.
Figure 6:
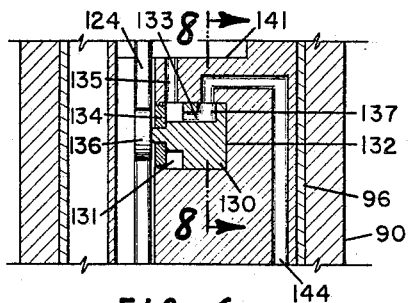
FIG. 6 is a partial sectional view taken on the line 6—6 of FIG. 3.
Figure 7:
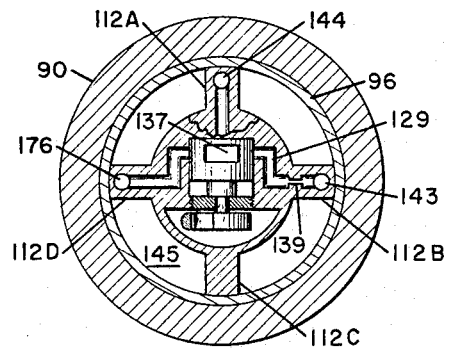
FIG. 7 is a sectional view taken on the line 7—7 of FIG. 3.
Figure 8:
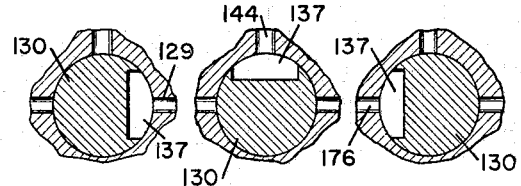
Figure 9:
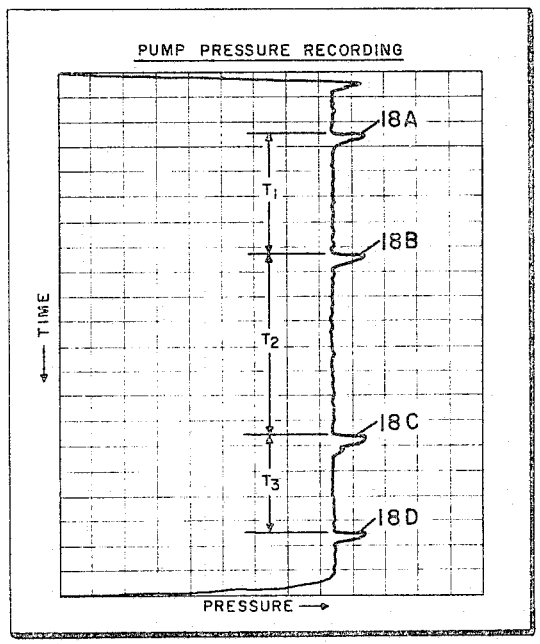
Figure 12:
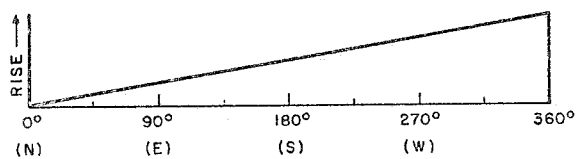
Figure 10:
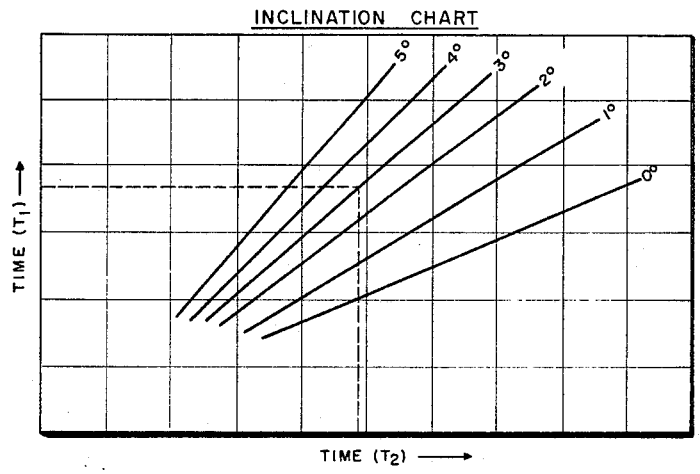
Figure 11:
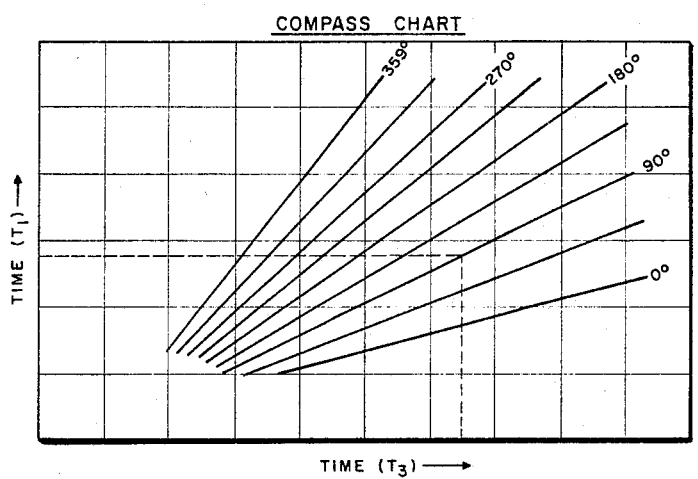

FIG. 8 consists of views 8A, 8B, and 8C showing different positions of the selector valve shown in FIGS. 6 and 7;

FIG. 9 is a pressure time chart taken on the circulating drilling fluid showing pressure pulses obtained from use of this invention;

FIG. 10 is an inclination chart for use with an instrument of this invention for determining the deviation of the well bore from vertical;

FIG. 11 is a compass chart for use with an instrument of this invention for determining the azimuth of inclination;

FIG. 12 illustrates the opening of an orifice for various directions of inclination in the compass portion of one embodiment of the instrument of this invention;

FIG. 13 illustrates a pressure recorder connected to the output of a mud pump;

FIG. 14 illustrates an alternate compass section for use with the apparatus of FIG. 3;

FIG. 15 and FIG. 16 illustrate geometrical configurations helpful in explaining certain characteristics of the compass section of FIG. 3; and FIG. 17 is a section taken along the line 17—17 of FIG. 14.

Figure 1:
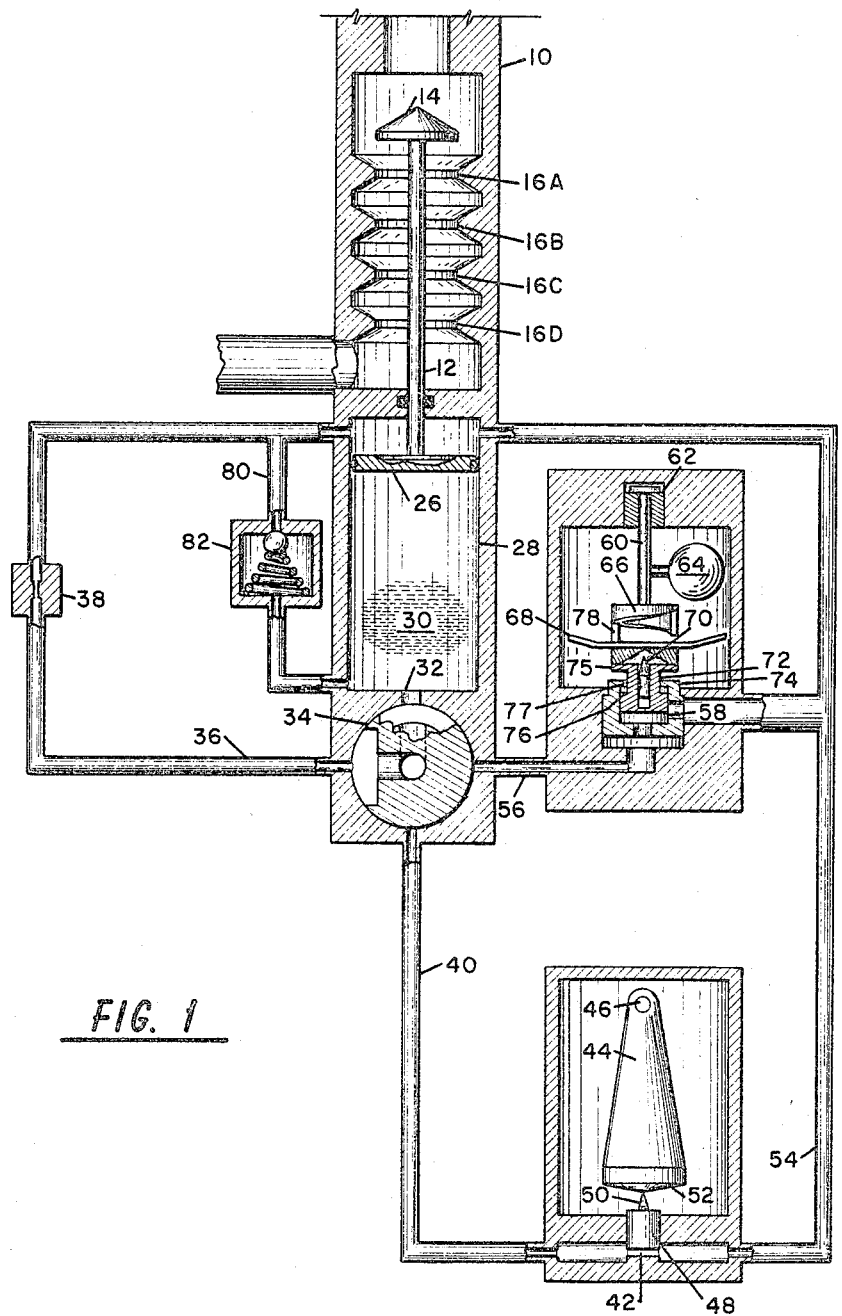
FIG. 1 is a schematic diagram illustrating the principle of the invention.

Attention will first be directed toward FIG. 1 for explaining the principles of this invention. Although the tool is to be used within the drill string it is shown in FIG. 1 in schematic form for simplification of illustration. In accordance with this invention, in a preferred embodiment there are three passage means. The first passage means contains a fixed restriction; the second passage means contains a variable restriction whose degree of obstruction is a function of the inclination of the borehole from vertical; and the third passage means contains a variable restriction which is a function of the direction or azimuth of the deflection of the inclination of the borehole. Means are provided to pump a known volume of hydraulic fluid through each passage means and to measure the time required for each such volume. As will be explained, the relationship of the times thus measured is an indication of the inclination of the borehole and the direction of such inclination.

FIG. 1 shows the lower end of the string of drill pipe 10 which is modified to have a series of annular restrictions 16A, 16B, 16C, and 16D. Supported within these annular restrictions is a signalling plunger means which includes a plunger rod 12 upon which is mounted a conical cap 14. The internal diameter of the restrictions is slightly greater than the external diameter of the base of conical cap 14. Drilling fluid or the circulating medium for removing the cuttings made by the bit is pumped downwardly through drill pipe 10. This circulating fluid forces the plunger conical cap 14 and plunger rod 12 downwardly. As the conical cap passes through each restriction 16A and 16B, a pressure surge or pressure pulse is generated which is recorded at the surface as indicated in FIG. 9 at 18A, 18B, 18C, and 18D, for example. The chart of FIG. 9 is a pressure chart showing the change in pressure of the drilling mud with respect to time. As shown in FIG. 13, pressure recorder 20 for making the chart of FIG. 9 is connected to discharge 22 of mud pump 24.

Returning now to FIG. 1, the lower end of plunger rod 12 is connected to piston 26 within cylinder 28. Cylinder 28 is filled with a hydraulic fluid 30. The lower end of cylinder 28 is connected to outlet 32 to a three-way valve 34. When valve 34 is in its first position, fluid is driven downwardly by piston 26 through valve 34, the fluid calibration section, which includes circuit 36 which has a fixed restriction 38. The fluid is returned to cylinder 28 above piston 26. When plunger cap 14 moves from restriction 16A to 16B, piston 26 has moved a fixed or known distance, and a known quantity of fluid has passed through restriction 38. This is indicated on FIG. 9 as time $T_1$, which is the time between pressure pulses 18A and 18B. Fixed restriction 38 is used as a calibration means inasmuch as the fluid 30 may have its characteristics changed by different temperature and pressure conditions as drilling proceeds.

Figure 2:
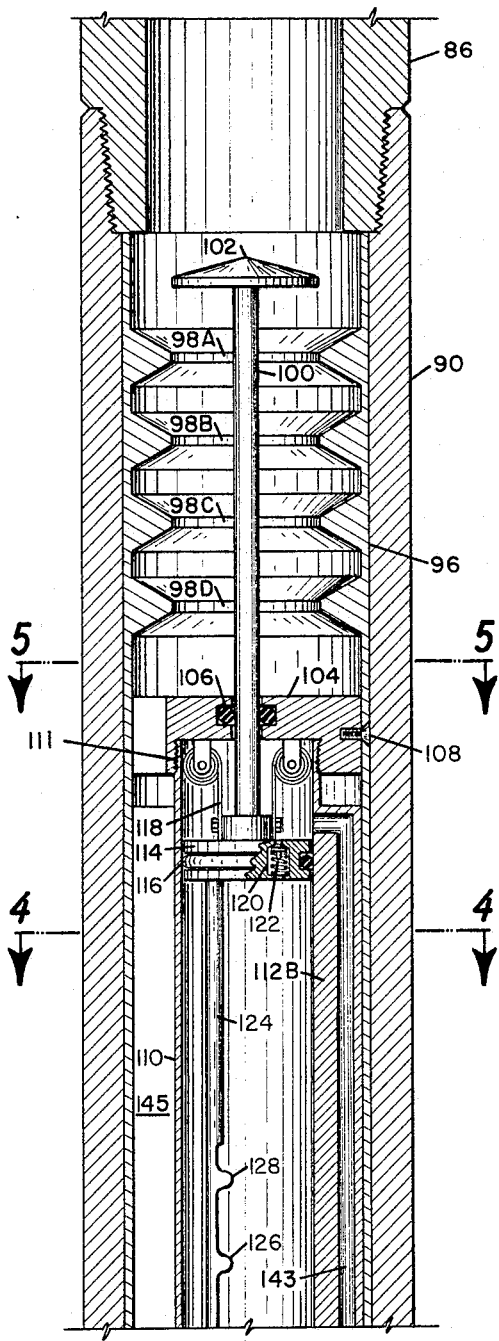
FIG. 2 is a sectional (elevation) view of the upper portion of a preferred embodiment of a drilling drift indicator.
Figure 5:
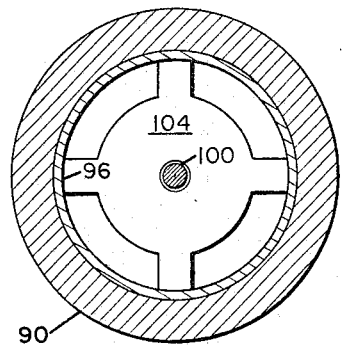
FIG. 5 is a sectional view taken on the line 5—5 of FIG. 2.

As will be seen, when FIGS. 2 and 3 are discussed, as plunger cap 14 passes restriction 16B, valve 34 is turned to its next position which connects discharge 32 of cylinder 28 to the inclination determination section. This section includes the second passage means 40 which has restriction 42 which varies as a function of the inclination of the borehole from the vertical. Also a part of the inclination section is pendulum 44 which is pivotally supported by pivot 46. The bottom of pendulum 44 is cam-shaped. A plug 48, having a limiting pin 50 is mounted in restriction 42. Plug 48 is biased downwardly; thus pin 50 comes in contact with the bottom of pendulum 44 only when pressure is applied through conduit 40. If the borehole is off vertical, pendulum 44 swings with respect to pin 50 and the amount of inclination determines the point along the bottom 52 of the pendulum with which pin 50 makes contact. For example, if there is no inclination, pin 50 makes contact at the lowest point, or center, of bottom 52. On the other hand, if there is inclination, the pendulum swings to a position with respect to the housing or pin 50 which is indicative of the inclination. The conical shape of bottom 52 of the pendulum permits pin 50 to move upwardly as a function of the inclination, thus increasing the opening of restriction 42. Thus, the size of restriction 42 is a function of the inclination of the borehole. The discharge side of restriction 42 is conduit 54 which connects to cylinder 28 above piston 26.

In operation when plunger cap 14 reaches restriction 16C, a pressure pulse 18C is recorded as on the chart of FIG. 9. This shows that it took time $T_2$ for the known quantity of fluid to pass through restriction 42. The time $T_2$ is a function of the inclination of the borehole.

At the same time the cap passes restriction 16C, valve 34 turns to its third position and connects discharge 32 with conduit 56 which leads to the compass section. Conduit 56 has restriction 58 which varies in area as a function of the direction of the inclination. The discharge side of orifice restriction 58 is into conduit 54 which returns to the upper side of the interior of cylinder 28 above piston 26. The compass means includes a rod 60 rotatably supported at 62. Extending outwardly from rod 60 is a mass 64 which, if there is any inclination, will be toward such inclination. At the lower end of rod 60 is a cam 66 whose surface is essentially a function of a sawtooth. A compass needle 68 is pivotally supported from pivot pin 70.

Pivot pin 70 is supported by a plug 72 which is slidably fitted within a second plug 74. The movement of plug 72 with respect to plug 74 is limited by lips 75 and 76 on plug 72 and lip 77 on plug 74. When valve 34 is in the third position, fluid under pressure from cylinder 28 raises plug 72 and plug 74 until such time as the limiting pin 78 on needle 68 comes in contact with the cam 66. Pin 78 is always in a known direction, i.e., north from pivot 70 and mass 64 is in a direction from the pivot which is a function of the direction of inclination of the borehole. Thus, the point at which limiting pin 78 contacts the cam is a function of the direction of inclination. As indicated in FIG. 12, the rise of pin 78 is a function of the direction of inclination. The use of pin 78 controls the opening of restriction 58. Thus the direction of inclination controls the degree of restriction. The time which it takes for plunger or conical cap 14 to pass from restriction 16C to 16D is indicated as time $T_3$ on chart of FIG. 9. A fixed volume of fluid passes through restriction 58 in time $T_3$. This time $T_3$ is a function of the opening of restriction 58.

The relationship of $T_2$ to $T_1$ indicates the inclination of the borehole, and the relationship of $T_3$ to $T_1$ indicates the direction of such inclination. This is readily shown in the following mathematical relation.

(1) $$F_p = f(c, d, \mu)$$

where:

$F_p$ is the force on the piston,
$c$ is the circulating rate of the mud,
$d$ is the density of the mud or circulating fluid, and
$\mu$ is the viscosity of the circulating mud.

From this, Equation 2 can be written.

(2) $$T_1 = f(F_{p1}\ \mu_0 d_0)\ g_1(A_1)$$

where:

$g_1$ is the discharge coefficient of restriction 38
$T_1$ is the time for a known volume of fluid to flow through fixed restriction 38, and
$A_1$ is the area of restriction 38.

Equation 3 can be written as follows:

(3) $$T_2 = f(F_{p1}, \mu_0, d_0)\ g_2(A_2)$$

where:

$g_2$ is the discharge coefficient of restriction 42
$A_2$ is the area of restriction 42, and $T_2$ is the time for the same volume of fluid to flow through restriction 42 as flowed through restriction 38.

The relationship of $T_1$ to $T_2$ can be written as follows:

(4) $$\frac{T_1}{T_2} = \frac{g_1(A_1)}{g_2(A_2)}$$

under steady-state conditions of circulating rate of the mud.

Let:

$$K_1 = g_1, A_1^2; K_2; = g_2 A_2^2;\ \text{and}\ K_3 = \frac{K_1}{K_2}$$

$$g_1(A_1) = \frac{K_1}{A_1}$$

$$g_2(A_2) = \frac{K_2}{A_2}$$

then $$\frac{T_1}{T_2} = K_3 \frac{A_2}{A_1}$$

As $A_1$ is fixed, $T_1/T_2$ is proportional to $A_2$, the opening of restriction 42 which is proportional to the inclination of the borehole. It also follows that the ratio of $T_1$ to $T_3$ is an indication of the opening of orifice 58 which is an indication of the azimuth of the inclination of the borehole.

An inclination chart illustrated in FIG. 10 and a compass calibrating chart illustrated in FIG. 11 are prepared for the drilling drift indicator of this invention. Briefly the chart in FIG. 10 is prepared by forcing a known quantity of fluid through calibrated restriction orifice 38 and the same quantity through orifice 42 when the pendulum is in a known position, such as for example 0° inclination. Times $T_1$ and $T_2$ are measured and provide one point on the chart. At the same position, the known quantity of fluid is passed through each orifice under a different pressure and a second set of times $T_1$ and $T_2$ are obtained. This locates a second point and fixes the straight line for 0° inclination on the chart of FIG. 10. The chart in FIG. 11 is similarly made with measurements made of $T_1$ and $T_3$ with the mass 64 in several positions, e.g., 0° north, 45°, 90°, etc. to 359°. Each line on the compass chart, similarly as on the inclination chart, a known or fixed volume is passed through the calibrated orifice and through the varied variable orifice under various pressures and temperatures for each selected position of the compass to obtain points for that particular position to define the chart line.

In operation of the tool, all that is necessary to do is to determine $T_1$ and $T_2$ from which a point fixed on FIG. 10, indicates the direction of inclination of the tool.

In FIG. 10, for the time $T_1$ indicated by the horizontal dotted line and the time $T_2$ indicated by the vertical dotted line, the inclination is 3°. In FIG. 11, for the time $T_1$, indicated by the horizontal dotted line and time $T_3$ indicated by the vertical dotted line, it is readily seen that the inclination is at 90° or in an eastern direction.

Also shown in FIG. 1 is a bypass conduit 80 connecting the part of cylinder 28 below piston 26 with that portion above the piston. This conduit 80 contains a check valve 82. As will be seen, check valve 82 has utility when plunger rod 12 and piston 26 are returned to their upward position so that the fluid can readily flow to the other side of the piston without returning through the various restrictions.

Figure 4:
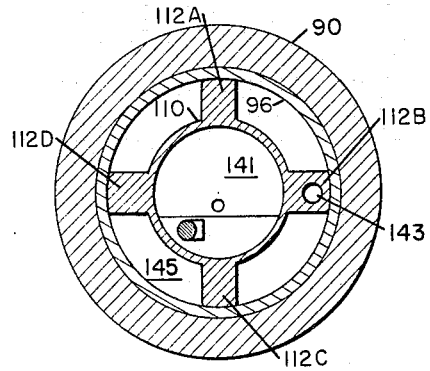
FIG. 4 is a section view taken on the line 4—4 of FIG. 2.

Attention is next directed to FIGS. 2 and 3 which together illustrate a view of a drilling drift indicator suitable for use in a string of drill pipe during drilling operations. Shown in FIGS. 2 and 3 is an upper tool joint 86 and a lower tool joint 88. Inserted between these tool joints is a housing means having an upper section 90 and a lower section 92 threadedly connected at 94. Section 92 surrounds the compass determination section and is made of a nonmagnetic material. Mounted within the outer housing is an inner sleeve member 96 which has a series of annular restrictions at the top portion thereof which are identified as restrictions 98A, 98B, 98C, and 98D. Also shown in the upper portion of the housing is a plunger rod 100 having a conical cap 102 at the top portion. The external diameter of cap 102 is slightly less than the internal diameter of restrictions 98A through 98D. The lower end of rod 100 extends through web member 104 which is provided with sealing means 106. Webbing means 104 is held in place with respect to sleeve 96 by a screw 108. Cylinder 110 is threadedly connected to the lower side of webbing means 104 at 111. The center of web 104 forms the upper enclosure for cylinder 110. As shown in FIG. 4, cylinder 110 is centered within sleeve 96 by radial arms 112A, 112B, 112C, and 112D.

Connected to the lower end of plunger rod 100 is piston 114 having sealing or piston ring 116. Constant tension springs 118 are connected between webbing member 104 and piston 114 to urge the piston in an upwardly direction. Mounted within conduit 120 through piston 114 is a check-valve means 122. This check valve permits downward flow only.

On the lower side of piston 114 is a valve actuating rod 124 having a first valve actuating gear tooth 126 and a second valve actuating gear tooth 128. The gear teeth 126 and 128 are for operating valve 130. Valve 130 is rotatably supported within a cylindrical cavity 132. Cavity 132 is formed in an enlarged or thickened portion 141 of the wall of the cylinder as clearly shown in FIG. 6. Valve 130 is held in cavity 132 by plate 134. A drive gear 136 is rigidly attached to valve 130 such that rotation of gear 136 rotates valve 130. The end view of gear 136 is shown in FIG. 3 having a first surface 138, a single tooth 140 and a third surface 142.

Valve 130 has an annular space 131 which is always in fluid communication with discharge conduit 135 which conduit is in communication with the down side of cylinder 110 below piston 114. A passage 133 establishes flow communication between annular space 131 with valve opening 137. The rotation of valve 130 determines whether valve opening 137 is in fluid communication with conduit 129 which leads to fixed restriction 139; to conduit 144 which leads to the pendulum section for determination of the inclination; or to conduit 176 which leads to the compass section for determining the azimuth of inclination, if any.

When the plunger rod 100 is in its uppermost position as shown in the drawing, gear wheel 136 is in the position shown in FIG. 3, and valve 130 provides fluid communication between the discharge conduit 135 of cylinder 110 below the piston with conduit 129 as shown in segmented section, FIG. 8A. When in this position, conduit 129 is in fluid communication through fixed restriction 139 with conduit 129 which connects to return conduit 143 to the upper side of piston 114.

During drilling operations, drilling fluid is circulated down through the interior of the drill string through tool joint 86 and around the conical head 102 and through the restrictions 98A, etc., and down through annular space 145 and through the interior of tool joint 88 to the rest of the drill string, bit, etc. As the drilling fluid flows downwardly, it drives conical cap 102 downwardly which forces piston 114 downwardly, which forces rod 124 downwardly. As gear tooth 126 on rod 124 comes in contact with gear wheel 136, it rotates it to its second position; such a position is shown in FIG. 8B. At this time, the power discharge conduit 135 from cylinder 110 is in fluid communication with conduit 144. Conduit 144 extends downwardly through leg 112A to the pendulum section and communicates with cavity 146. A floating plug 148 is placed in cavity 146 and has a pin 150 which contacts the bottom of pendulum 151. Plug 148 is biased downwardly. The pendulum is rotatably supported within cavity 162 by rod 152 which is rotatably supported by rod 154 which is rotatably mounted in the housing section 156. The pendulum housing section is supported from the lower part of cylinder 110. The fluid under pressure in conduit 144 drives the plug 148 upwardly until the limiting pin 150 contacts the bottom of pendulum 151. As previously discussed, the particular portion of the bottom which pin 150 contacts depends upon the inclination of the borehole. Further, the area of restriction 158 which is that portion of cavity 146 which opens into conduit 160 is dependent upon the inclination of the borehole. Conduit 160 is connected to return conduit 143.

Cavity 162 in which pendulum 151 is mounted contains a dampening fluid 164 which can be Dow Corning type 1500 centistokes. The pressure of the dampening fluid 164 is maintained at the pressure of the return fluid in conduit 143. This is accomplished by separating the fluid 164 from fluid in return conduit 143 by a diaphragm 170 which is mounted in cavity 172 with one side of the diaphragm in communication with the dampening fluid 164 and the other side in communication through conduit 174 with conduit 143.

As the plunger section cap 102 moves downwardly to restriction 98C, gear tooth 128 contacts tooth 140 of gear tooth wheel 136 and rotates the valve until it is in the position shown in FIG. 8C in which communication is established between discharge conduit 135 and conduit 176 which leads to the compass section. Thus, fluid communication is established between cavity 178 below plugs 180 and 182 and conduit 135. Plug 182 floats within plug 180 which floats within cavity 178. The movement of plug 182 within plug 180 is limited by limiting shoulders 183 and 184 on plug 182 and by annular member 185 on plug 180. A compass cavity 191 is formed below pendulum cavity 162. A compass 186 having an upwardly facing limiting protrusion or pin 188 is rotatably supported within cavity 191 on pivot 190 which is fixed with respect to the housing. Rotatably mounted above compass 186 within compass section 191 is a rod 192 which is rotatably supported with respect to lower section by bearing 194. At the lower end of rod 192 is a cam 196 which defines a sawtooth waveform as illustrated in FIG. 12. An eccentric mass 197 is mounted on rod 192 so that the mass 197 falls in the direction of the inclination of the tool.

When valve 130 is in the position shown in FIG. 8C, conduit 176 then forces the plugs 182 and 180 upwardly until compass 186 is stopped by pin 188 coming in contact with the cam face 196. The amount of rise of plug 180 depends upon the direction of the inclination as indicated by the position of mass 197. This position determines the opening of restriction 198. The size of the opening controls the time for plunger cap 102 to travel from restriction 98C to 98D.

The cavity 191 is filled with a dampening fluid 200. The dampening fluid 200 is maintained at the same pressure as the discharge driving fluid in conduit 143 by a diaphragm 202, which separates the two fluids similarly as does diaphragm 170.

It is also desirable to maintain the driving fluid within conduit 143 at essentially the same pressure as the circulating fluid in the passage of tool joint 88. This is easily accomplished by having a diaphragm 204 placed in a cavity 206. Cavity 206 is spaced below compass cavity 191. The cavity on one side of the diaphragm 204 is in fluid communication with the passage in tool joint 88 and the other side is in fluid communication with the return conduit 143.

Having described the structural components of the preferred form of apparatus, attention will now be directed briefly toward its use in operation. The drilling drift indicator is connected into a string of drill pipe near the bit between tool joints 86 and 88. When the tool is first inserted, the piston 114 and the valve 130 will be in the position shown in FIGS. 2, 3, and 8A. The drilling drift indicator can be placed in the string of drill pipe and left there during the entire drilling operation as it does not interfere with the normal drilling. In normal drilling operations, as a well bore is deepened, individual joints of drill string are added to the upper part of the previous drill string to accommodate the drilling of the deeper hole. Each time such a joint of drill string is added, the mud pumps, which force the drilling fluid downwardly through the drill string, are shut off and rotation of the drill string ceases. There is no drilling nor advance in the borehole until the new joint is put into effect in the drill string and drilling fluid is again circulated down through the drill string and rotation commenced. With the present drill drift indicator in the drill string, when the pumps are started, fluid pressure on top of conical cap 102 starts driving the plunger downwardly through the plunger section.

When conical cap 102 reaches restriction 98A, a first pressure pulse 18A is recorded on the chart of FIG. 9. At this time the valve is in the position as shown in FIG. 8A so that the fluid within cylinder 110 is forced through the fixed restriction 139. As the plunger moves downwardly, it passes restriction 98B and at this time pressure pulse 18B is recorded in FIG. 9. The time $T_1$ is thus established which is the time required for a known or fixed quantity of fluid to move through the calibration orifice 139.

When conical cap 102 reaches restriction 98B, gear tooth 126 rotates gear wheel 136 so that the valve is in the position shown in FIG. 8B. As the drilling fluid continues to circulate downwardly, the conical cap 102 passes restriction 98C. Again a pulse is recorded, this time pulse 18C on the chart. The time between pulses 18B and 18C is $T_2$ which is the time required for a given volume of fluid to pass through restriction 158 whose opening is the function of the inclination of the well bore.

As the plunger 102 moves downwardly to the restriction 98C, gear tooth 128 rotates the valve so that it is in the position shown in FIG. 8C; here the discharge side of the cylinder below piston 114 is in fluid communication with the orifice or restriction 198 whose opening is a function of the direction of the inclination of the borehole. The pumping of drilling fluid is continued and cap 102 passes restriction 98D. At this time, a fourth pulse, 18D, is recorded on the chart of FIG. 9 and the time $T_3$ is thus established. As shown above, the times $T_1$ and $T_2$ are used with the inclination chart of FIG. 10 to determine the degrees of inclination which the borehole may have. The times $T_3$ and $T_1$ are used with the compass chart of FIG. 11 to determine the azimuth of any inclination.

After the fourth pressure pulse, 18D, is recorded, rotation of the drill string is commenced and drilling proceeds. When drilling has advanced the length of a conventional joint of drill pipe, the mud pumps are again shut down and rotation is stopped. When the pumps are shut down, the upward force of drilling fluid on conical cap 102 is essentially the same as the downward force. Thus, piston 114 is pulled upwardly by constant tension springs 118. The fluid above piston 114 passes downwardly through check valve 122 to the lower side there. As piston 110 is raised, so is bar 124. This rotates gear wheel 136 so that valve 130 is rotated back to the position shown in FIG. 8A. During drilling operations, in order to aid in avoiding leaks and the like, the hydraulic fluid within the drilling drift indicator is maintained at essentially the same pressure as the circulating drilling fluid or mud. This is accomplished by diaphragm 204 separating the drilling mud from the hydraulic fluid. After the additional joint of drill pipe is added to the drill string, the mud pumps are started and the measurement or chart as shown in FIG. 9 is made and then the rotation is started. The primary reason why the drill string is not rotated until after plunger 102 passes restriction 98D is to keep down vibrations during the time the measurements are made in order that the measurements will be more accurate. When using the drilling drift indicator, it is most convenient to take measurements each time a joint of drill string is added to determine inclination, if any, of the borehole and the direction or azimuth of any such inclination. The time required to run the chart in FIG. 9 is very small, being not over about one or two minutes, although the exact time will depend upon the pressure of the drilling fluid, the length of the distances between the restrictions, etc. It is, of course, to be understood that the measurements as shown on FIG. 9 can be made any time whether a new joint of drill pipe is added or not. This is accomplished merely by stopping the rotation and the mud pumps so that the plunger 102 can return to the position shown in FIG. 2 and then starting up the mud pumps to drive the plunger downwardly.

Means are provided to obtain absolute readings of the azimuth at high drift angles by use of a measured drift in degrees and a measured apparent azimuth by the following method. The difference between the apparent azimuth, as determined by the instrument illustrated in FIGS. 2 and 3, and true azimuth is a function of the degrees or amount of inclination and the particular direction in which the borehole is inclined. This will become apparent from looking at FIG. 15 in which the following terms have the meanings assigned:

$T$ = direction of inclination of borehole
$N_a$ = apparent north
$N_t$ = true north
$\theta$ is the true angle between the direction of inclination of the borehole and true north
$\phi$ is the angle between the direction of the inclination and the apparent north.

In FIG. 15 the ellipse represents the travel projected into a plane perpendicular to the axis of the tool of pin 188 of the compass with respect to cam 196 as it goes through 360°. The circle in FIG. 15 represents the points on the ellipse when it is rotated about the axis A—A from a horizontal position, e.g. the amount of the inclination of the borehole.

When the compass is in the tool in an inclined hole the compass pin points in the direction of true north ($N_t$) which intersects the ellipse at $d$. When the compass is forced upwardly by fluid pressure flowing through conduit 176 the compass is rotated around the axis and point $d$ becomes, in effect, point $c$ on the circle.

In FIG. 16 one line lies in the plane of the circle and the other line lies in the ellipse of FIG. 15. In FIG. 16, $\omega$ indicates the inclination of the bore hole which is also the angle between the circle and ellipse at FIG. 15. What one is interested in, is obtaining $\theta$, that is the angle of the direction of inclination from true north. This can be developed as follows:

$$ob = oa \cos \omega$$

$$\frac{ob}{oa} = \cos \omega$$

$$ac = bd$$

$$\frac{ac}{oa} = \tan \phi$$

$$\frac{bd}{ob} = \tan \theta$$

$$oa \tan \phi = ob \tan \theta$$

$$\tan \theta = \frac{oa}{ob} \tan \phi$$

$$\tan \theta = \cos \omega \tan \phi$$

$$\theta = \tan^{-1}(\cos \omega \tan \phi)$$

Thus, it is clear that if one knows $\omega$, the angle of inclination of the bore, and $\phi$, the apparent direction of inclination of the borehole from north, then one can readily compute the true direction of inclination of the borehole.

From the above, it is readily seen that for an inclination of less than about 20° that the difference between the actual direction of inclination and the apparent direction of inclination, as determined by the compass section of FIG. 3 is very negligible, being a maximum of less than about 1.8°. In most drilling operations, this is of no concern.

An alternate form of the compass section is shown in FIG. 14 which largely eliminates any error between the apparent direction of inclination and the true direction of any angle of inclination. Shown in FIG. 14 is fluid inlet 176A which corresponds to inlet or conduit 176 of FIG. 3. Conduit 176A connects to a variable orifice or restriction 210 which opens into cavity 212 which connects through conduit 214 to return conduit 143 similarly as the compass section of FIG. 3. Cavity 212 is also in fluid communication with cavity 172 which has diaphragm 202 similarly as FIG. 3.

Shown in FIG. 14 are two cavities 216 and 218 which are connected by conduit 220. A shaft 222 is mounted in the body of the tool such that its longitudinal axis is parallel to or concentric with the longitudinal axis of the drill string. Shaft 222 is rotatably mounted as, for example, by having head 224 resting upon bushing 226 which is supported in a cavity 228 above cavity 216. A pendulum 230 is supported within cavity 218 from shaft 222. Pendulum 230 is mounted and supported from shaft 222 as shown more clearly in FIG. 17 which shows pins 232 and 234 mounted in holes 236 and 238, respectively, of pendulum 230. Pendulum 230 swings on pins 232 and 234.

Mounted in orifice 210 is a variable plug valve 240 which is biased upwardly by springs 242. Extending downwardly from valve 240 is a flexible shaft 244 which is protected by casing 246. The shaft 244 extends downwardly through shaft 222 and through the upper part of pendulum 230 and outwardly into cavity 248 within pendulum 230.

A compass 250 is also mounted in cavity 248 and is supported by axle 252 which due to the pendulum action is always in a vertical position. Thus, compass 250 is always horizontal. Compass 250 is provided with a cam 254 similarly as the cam 196 which has a shape similar to that as shown in FIG. 12. The compass is urged upwardly by a spring 256.

In operation, when there comes a cycle in the operations to determine the direction of inclination, fluid, under pressure, is inserted through conduit 176A which forces valve 240 downwardly and thus forces flexible shaft 244 downwardly into cavity 248 until such time as the end of the shaft strikes cam 254. The compass is then pushed downwardly until the compass strikes the bottom of cavity 248. The particular position of the cam which shaft 244 engages is determined by the direction of inclination of the well bore. The compass always points north, however, pendulum 230 is always leaning in the direction of the inclination. This is achieved by providing shaft 222 with an eccentric mass 260. As drilling progresses, eccentric mass 260 is always leaning or pointing in the direction of the inclination of the borehole. This rotates shaft 222 so that pins 232 are perpendicular to such direction of inclination. Pendulum 230 then rotates in the direction of the inclination. As compass 250 is always essentially horizontal there is essentially no corrections to be made, such as were required above for certain angles to determine the difference between the true direction and the apparent direction.

While there are disclosed above but a limited number of embodiments of the system of the invention herein presented, it is possible to produce still other embodiments without departing from the inventive concept herein disclosed. It is therefore desired that only such limitations be imposed on the appended claims as are stated therein.

What is claimed is:

1. A drilling drift indicator for use in drilling a borehole which comprises:
   a first passage means;
   first means to restrict at least a portion of said first passage means as a function of the deflection of the borehole from the vertical;
   a second passage means;
   second means to restrict at least a portion of said second passage means as a function of the direction of the deflection of the borehole;
   a third passage means having a fixed restriction therein;
   means to pump known quantities of fluid independently through said first passage means, said second passage means and said third passage means; and
   means to determine the time required for pumping such known volume of fluid through each said passage means.

2. A drilling drift indicator for use with the rotary drilling of a well bore using a drill string which comprises:
   an elongated housing insertable into said drill string, said housing having a channel therethrough for the passage of circulating fluid;
   a first passage means within said housing;
   first means to vary the resistance to flow of fluid through said first passage means as a function of the inclination of said housing;
   second passage means within said housing;
   second means to vary the resistance to flow of fluid in said second passage means as a function of the direction of such inclination;
   a third passage means in said housing having a fixed resistance to flow of fluid therethrough;
   pumping means including means to pump a known quantity of fluid independently through each said passage means; and
   means indicating the time required for the passage of each known volume of fluid through each said passage means.

3. An apparatus for use in drilling a borehole which comprises:
   a housing member;
   a first passage means supported by said housing member and having a fixed restriction therein;
   a second passage means within said housing member;
   means to restrict at least a portion of said second passage means as a function of the inclination of the borehole from the vertical;
   means to pump known quantities of fluid independently through said first passage means and said second passage means; and
   means to determine the time required for pumping such known volume of fluid through each said passage means.

4. An apparatus for use in drilling a borehole which comprises:
   a housing member;
   a first passage means within said housing member and having a fixed restriction therein;
   a second passage means within said housing member;
   means to restrict at least a portion of said second passage means as a function of the direction which the hole is deviating from the vertical;

means to pump known quantities of fluid independently through said first passage means and said second passage means; and means to determine the time required for pumping said known volume of fluid through each said passage means.

5. A drilling drift indicator for use in drilling a borehole which comprises:

a housing member, said housing member having a first passage means for conveying fluid from one end of the housing member to the other end, one portion of said passage means having a first restriction, a second restriction, a third restriction, and a fourth restriction, such restrictions being equally spaced;

a first hydraulic fluid cylinder within said housing member and having an upper and a lower end;

a pendulum compartment within said housing member;

a compass compartment within said housing member;

a plunger rod within said housing member extending at least from said first restriction downwardly through the upper end of said cylinder;

a cap means mounted on the upper end of said plunger rod;

a piston mounted on the lower end of said plunger rod and within said cylinder;

means biasing said piston upwardly within said chamber;

a discharge conduit in fluid communication with the cylinder beneath said piston;

a first conduit means establishing fluid communication between said discharge conduit and the interior of said cylinder above said piston, said first conduit means having a fixed restriction therein;

a second conduit means having a variable restriction therein and connecting said discharge conduit with said cylinder above said piston;

a third conduit means establishing fluid communication between said discharge conduit and the interior of said cylinder above said piston;

a pendulum pivotally supported within said pendulum compartment;

means to vary the restriction within said second conduit means in response to the position of said pendulum within said pendulum compartment;

a rod loaded with an eccentric weight and rotatably mounted within said compass compartment;

means to restrict the flow within said third conduit means as a function of the position of the eccentric weight;

a first dampening fluid within said pendulum compartment;

a second dampening fluid within said compass compartment;

means for equalizing the pressure of said first dampening fluid and said second dampening fluid with that of the pressure within said cylinder above said piston;

valve means having three positions, one position fluidly connecting said discharge conduit with said first conduit means, a second position connecting said discharge conduit with said second conduit means and a third position connecting said discharge conduit with said third passage means;

means to actuate said valve means such that said valve is in its first position when said cap means is between said first and said second restriction, in its second position when said cap means is between said second and third restrictions and in its third position when said cap means is between its third and fourth restrictions;

a second passage means between the cylinder above said piston and the first passage means for conveying drilling fluid through the tool; and a diaphragm within said second passage means.

6. An apparatus for use in drilling a borehole which comprises:

a housing member;

a first passage means supported by said housing member and having a fixed restriction therein;

a second passage means within said housing member;

means to restrict at least a portion of said second passage means as a function of the direction of inclination of the borehole;

means to pump a known quantity of fluid independently through said first passage means and through said second passage means; and means to record the time required for pumping such known volumes of fluid through each said passage means.

7. An apparatus insertable within a drill string for use in drilling a borehole which comprises:

a housing member insertable within said drill string, said housing member having a cleaning fluid passage for conveying fluid from one end of the housing member to the other, one portion of said passage means having a first restriction, a second restriction, and a third restriction, such restrictions being equally spaced;

a first hydraulic fluid cylinder within said housing and having an upper and a lower end;

a pendulum compartment within said housing member;

a plunger rod within said housing member extending at least from said first restriction downwardly through the upper end of said cylinder;

a cap means mounted on the upper end of said plunger rod;

a piston mounted on the lower end of said plunger rod within said cylinder;

means biasing said piston upwardly within said cylinder;

a discharge conduit in fluid communication with the cylinder beneath said piston;

a first conduit means establishing fluid communication between said discharge conduit and the interior of said cylinder above said piston, said first conduit means having a fixed restriction therein;

a second conduit means connecting said discharge conduit with said cylinder above said piston;

a pendulum pivotally supported within said pendulum compartment;

means to vary the restriction within said second conduit means in response to the position of said pendulum within said pendulum compartment;

valve means having two positions, one position fluidly connecting said discharge conduit with said first conduit means, and when in a second position connecting said discharge conduit with said second conduit means; and means to actuate said valve means such that said valve is in its first position when said cap means is between said first and said second restrictions and in a second position when said cap means is between said second and said third restrictions.

8. An apparatus as defined in claim 7 including a dampening fluid within said pendulum compartment and means for equalizing the pressure of said dampening fluid with that of the pressure within said cylinder above said piston.

9. An apparatus as defined in claim 7 including means for equalizing the pressure of the fluid within said cylinder above said piston with that of the pressure of the fluid within the cleaning fluid passage of said housing member.

10. An apparatus insertable within a drill string for use in drilling a borehole which comprises:

a housing member insertable within said drill string, said housing member having a cleaning fluid passage for conveying fluid from one end of the housing member to the other, one portion of said passage having a first restriction, a second restriction, and a third restriction, such restrictions being equally spaced;
a first hydraulic fluid cylinder within said housing and having an upper and lower end;
a pendulum compartment within said housing member;
a plunger rod within said housing member extending at least from said first restriction downwardly through the upper end of said cylinder;
a cap means mounted upon the upper end of said plunger rod;
a piston mounted on the lower end of said plunger rod within said cylinder;
means biasing said piston upwardly within said cylinder;
a discharge conduit in said cylinder beneath said piston;
a first conduit means establishing fluid communication between said discharge conduit and the interior of said cylinder above said piston, said first conduit means having a fixed restriction therein;
a second conduit means connecting said discharge conduit with said cylinder above said piston, said second conduit means having a variable restriction therein;
a pendulum having a compass cavity and supported within said pendulum compartment;
a compass mounted within the compass cavity of said pendulum;
a variable plug valve in said restriction of said second conduit means;
means biasing said valve toward a closed position;
a flexible shaft extending from said plug valve to the compass cavity within said pendulum;
a cam mounted on said compass, said cam and said flexible shaft being positioned so that when said flexible shaft is extended into said compass cavity, it contacts said cam;
valve means having at least two positions, one position fluidly connecting said discharge conduit with said first conduit means, and when in the second position connecting said discharge conduit with said second conduit means; and
means responsive to the position of said cap means to actuate said valve means such that said valve is in its first position when said cap means is between said first and said second restrictions and in a second position when said cap means is between said second and said third restrictions.

11. An apparatus insertable in a drill string used in drilling a borehole which comprises:
a housing member insertable within said drill string, said housing member having a cleaning fluid passage for conveying fluid from one end of the housing member to the other, one portion of said passage having a first restriction, a second restriction, a third restriction, and a fourth restriction, such restrictions being equally spaced;
a first hydraulic fluid cylinder within said housing and having an upper end and a lower end;
a first pendulum compartment supported within said housing member;
a second pendulum compartment supported within said housing member;
an eccentric weight cavity within said housing member above said second pendulum compartment;
a plunger rod within said housing member extending at least from said first restriction downwardly through the upper end of said cylinder;
cap means mounted upon the upper end of said plunger rod;
a piston mounted on the lower end of said plunger rod within said cylinder;
means biasing said piston upwardly within said cylinder;
a discharge conduit in said cylinder beneath said piston;
a first conduit means establishing fluid communication between said discharge conduit and the interior of said cylinder above said piston, said first conduit means having a fixed restriction therein;
a second conduit means having a variable restriction therein and connecting said discharge conduit with said cylinder above said piston;
a first pendulum pivotally supported within said first pendulum compartment;
means to vary the restriction within said second conduit means in response to the position of said first pendulum within said first pendulum compartment;
a second pendulum supported within said second pendulum compartment, said second pendulum having a compass cavity therein;
a hollow shaft rotatably mounted within said housing member and extending longitudinally from above said eccentric mass cavity to said second pendulum compartment;
an eccentric mass extending laterally from said hollow shaft within said eccentric mass cavity; said hollow shaft having a pendulum support axis which lies in a plane essentially perpendicular to said eccentric mass;
a third conduit means connecting said discharge conduit with said cylinder above said piston, said third conduit means having a restriction therein, such restriction being positioned above said shaft and axially aligned therewith;
means supporting said compass pendulum on said pendulum support axis of said hollow shaft;
a compass mounted within the compass cavity of said second pendulum;
valve means positioned adjacent said restriction of said third conduit means and adapted to vary the restriction;
means biasing said plug valve toward a closed position;
a flexible shaft extending from said plug valve to the compass cavity within said pendulum;
a cam mounted on said compass, said cam and said flexible shaft being positioned so that when said flexible shaft is extending into said compass cavity it contacts said cam;
valve means having at least three positions, one position fluidly connecting said discharge conduit with said first conduit means, when in a second position connecting said discharge conduit with said second conduit means, and in a third position connecting said discharge conduit with said third conduit means; and
means responsive to the position of said cap means to actuate said valve means such that said valve is in its first position when said cap means is between said first and said second restriction, in a second position when said cap means is between said second and said third position, and in a third position when said cap means is between said third and said fourth restrictions.

12. An apparatus as defined in claim 11 including a dampening fluid within said first pendulum compartment and means for equalizing the pressure of said dampening fluid with that of the pressure within said cylinder above said piston.

13. An apparatus as defined in claim 12 including means for equalizing the pressure of fluid within said cylinder above said piston with that of the pressure of said fluid within the cleaning fluid passage of said housing member.

14. An apparatus as defined in claim 12 including means to record pressure variations in the cleaning fluid within said drill string caused by said cap means passing one of said restrictions in said cleaning fluid passage.

(References on following page)

References Cited by the Examiner

UNITED STATES PATENTS

| | | | |
|---|---|---|---|
| 2,309,905 | 2/1943 | Irwin et al. | 33—205.5 |
| 2,350,048 | 5/1944 | May | 73—38 |
| 2,516,188 | 7/1950 | Dietert et al. | 73—38 |
| 2,761,218 | 9/1956 | Bielstein | 33—205 |

FOREIGN PATENTS 645,846  4/1937  Germany.

LEONARD FORMAN, *Primary Examiner.*

ISAAC LISANN, *Examiner.*

W. K. QUARLES, Jr., *Assistant Examiner.*